US012055489B2

(12) United States Patent
Bolton et al.

(10) Patent No.: US 12,055,489 B2
(45) Date of Patent: Aug. 6, 2024

(54) EVANESCENT FIELD RESONANCE IMAGING MICROSCOPY APPARATUS AND METHOD

(71) Applicant: The University of Melbourne, Victoria (AU)

(72) Inventors: Christopher Graham Bolton, Victoria (AU); Raymond Riley Dagastine, Victoria (AU)

(73) Assignee: The University of Melbourne, Melbourne (AU)

( * ) Notice: Subject to any disclaimer, the term of this patent is extended or adjusted under 35 U.S.C. 154(b) by 354 days.

(21) Appl. No.: 17/607,771

(22) PCT Filed: Apr. 30, 2020

(86) PCT No.: PCT/AU2020/050427
§ 371 (c)(1),
(2) Date: Oct. 29, 2021

(87) PCT Pub. No.: WO2020/220083
PCT Pub. Date: Nov. 5, 2020

(65) Prior Publication Data
US 2022/0214259 A1    Jul. 7, 2022

(30) Foreign Application Priority Data
May 1, 2019   (AU) .................. 2019901484

(51) Int. Cl.
*G01N 21/552*   (2014.01)
*G01N 15/02*   (2024.01)
(Continued)

(52) U.S. Cl.
CPC ....... *G01N 21/552* (2013.01); *G01N 15/0227* (2013.01); *G02B 21/06* (2013.01);
(Continued)

(58) Field of Classification Search
CPC .. G02B 21/0004; G02B 21/06; G02B 21/365; G02B 27/56; G02B 21/10; G01N 15/02;
(Continued)

(56) References Cited

U.S. PATENT DOCUMENTS 6,280,960 B1   8/2001  Carr
6,987,609 B2 *  1/2006  Tischer .................. G02B 21/02
                                        359/385
(Continued)

FOREIGN PATENT DOCUMENTS

CN    103048272 A  *  4/2013
CN    107356566 A  *  11/2017  ............. G01N 21/01
(Continued)

OTHER PUBLICATIONS

Agnarsson, et al., "Evanescent Light-Scattering Microscopy for Label-Free Interfacial Imaging: From Single Sub-100 nm Vesicles to Live Cells," ACS Nano, 2015, vol. 9, No. 12, pp. 11849-11862.
(Continued)

*Primary Examiner* — Gordon J Stock, Jr.
(74) *Attorney, Agent, or Firm* — FOLEY & LARDNER LLP

(57) ABSTRACT

A method for characterising a sample located within an imaging region, the method comprising the steps of: generating one or more evanescent fields, each associated with a direction, within the imaging region; capturing an image of the imaging region; determining 5 one or more sample characteristics of the sample according to a spatial intensity pattern resulting from an interaction between the, or each, evanescent field and the sample within the image, and associated apparatus and system.

14 Claims, 18 Drawing Sheets

(51) Int. Cl.
*G01N 15/0227* (2024.01)
*G02B 21/06* (2006.01)
*G02B 21/36* (2006.01)
*G02B 27/56* (2006.01)

(52) U.S. Cl.
CPC ........... *G02B 21/365* (2013.01); *G02B 27/56* (2013.01); *G01N 2015/0294* (2013.01)

(58) Field of Classification Search
CPC ........... G01N 15/0205; G01N 15/0227; G01N 2015/0294; G01N 21/552; G01N 21/553; G01N 21/554; G01N 21/59; G01N 21/648; G01N 2021/5903
See application file for complete search history.

(56) References Cited

U.S. PATENT DOCUMENTS

| | | | |
|---|---|---|---|
| 9,012,872 B1 | 4/2015 | Fang | |
| 10,883,939 B2* | 1/2021 | Van Dorpe | G01N 21/648 |
| 2004/0196457 A1 | 10/2004 | Aono et al. | |
| 2004/0240046 A1 | 12/2004 | Tischer et al. | |
| 2012/0176672 A1 | 7/2012 | Cooper | |
| 2015/0212307 A1* | 7/2015 | Dohi | G02B 21/361 359/385 |
| 2017/0160531 A1* | 6/2017 | Knebel | G01N 21/6458 |

FOREIGN PATENT DOCUMENTS

| | | | | |
|---|---|---|---|---|
| CN | 108061965 A | * | 5/2018 | ......... G02B 21/0048 |
| CN | 108982456 A | * | 12/2018 | ......... G01N 21/6486 |
| CN | 106970460 B | | 4/2019 | |
| JP | 2004-318133 A | | 11/2004 | |
| JP | 2009-145104 A | | 7/2009 | |
| JP | 2017-021050 A | | 1/2017 | |
| WO | WO-03/023483 A2 | | 3/2003 | |
| WO | WO-03/093801 A1 | | 11/2003 | |
| WO | WO-2005/031429 A1 | | 4/2005 | |
| WO | WO-2008/072156 A2 | | 6/2008 | |
| WO | WO-2012/090759 A1 | | 7/2012 | |
| WO | WO-2021143637 A1 | * | 7/2021 | ............ G02B 21/06 |

OTHER PUBLICATIONS

Byrne, et al., "Live imaging of cellular internalization of single colloidal particle by combined label-free fluorescence total internal reflection microscopy," Journal of Microscopy, 2008, 231(1), pp. 168-179.
Hertlein, et al., "Experimental Verification of an Exact Evanescent Light Scattering Model for TIRM," Langmuir, Jan. 1, 2008 vol. 24, No. 1, 4 pages.
International Search Report and Written Opinion dated May 22, 2020, from application No. PCT/AU2020/050427.
International-type search for provisional patent application dated Apr. 8, 2020, from Australian patent application No. 2019901484.
Nahar, Qamrun, "Oriented Collagen and Applicants for Waveguide Evanescent Field Scattering (WEFS) Microscopy," 2014, PHD Thesis, The University of Western Ontario Electronic Thesis and Dissertation Repository, 117 pages.
Wu, et al., "Resonant Effects in Evanescent Wave Scattering of Polydisperse Colloids," Langmuir, 2008, vol. 24, pp. 13790-13795.
Yu, et al., "Measurement of nanoparticle sizes by conventional optical microscopy with standing evanescent field illumination," Optics Letters, Dec. 1, 2008, vol. 33, No. 23, pp. 2794-2796.
Extended European Search Report issued by the European Patent Office on Dec. 22, 2022, 11 pages, for corresponding European Patent Application No. 20798724.9.
Olveczky, Bence P., et al., "Mapping Fluorophore Distributions in Three Dimensions by Quantitative Multiple Angle-Total Internal Reflection Flourescence Microscopy," Biophysical Journal, vol. 73, Nov. 1997, pp. 2836-2847.
Notice of Reasons for Refusal dated Dec. 26, 2023 issued in corresponding Japanese Patent Application 2021-564595, with English translation, 10 pages.
Takashi, Satoshi, et al., "Super-Resolution Imaging Using Standing Evanescent Wave Illumination," Jul. 10, 2009, vol. 38, No. 7, pp. 364-372, with English machine translation, 18 pages.

* cited by examiner

EVANESCENT FIELD RESONANCE IMAGING MICROSCOPY APPARATUS AND METHOD

CROSS-REFERENCE TO RELATED APPLICATIONS

This application is a U.S. national stage application under 35 U.S.C. § 371 claiming the benefit of International Patent Application No. PCT/AU2020/050427, filed Apr. 30, 2020, which claims priority to Australian Patent Application No. 2019901484, filed May 1, 2019, the entire contents of each of which are incorporated herein by reference.

FIELD OF THE INVENTION

The invention generally relates to imaging and/or characterising the geometry of samples (e.g. particles, structures, substrates) using evanescent field scattering/resonance.

BACKGROUND TO THE INVENTION

Particle characterisation (e.g. determination of one or more size and/or shape parameters) is critical to many industrial processes for tuning product fabrication, formulation and quality control. It is routinely carried out, for example as part of an R&D programme or as an element of quality control. It is routinely used in the formulation and manufacture of products in industrial sectors including pharmaceuticals, chemical processing, mining and minerals process, food and beverage, consumer products and coatings (e.g. paint) and many others.

There are many existing methods for particle characterisation. These can be roughly arranged into categories including microscopy methods (optical or otherwise), flow methods, diffraction methods and diffusion-based methods. Most of these methods assume spherically shaped particles, and when this is not the case, often require either ultrahigh-vacuum sample preparation or complicated chemical labelling.

The accuracy of standard optical microscopy using white light for bright-field image analysis techniques (e.g. extracting size and/or shape parameters of a particle from a video microscope image) is fundamentally limited by the wavelength of visible light, where in practice particle sizes and shapes are difficult or resolve below 1 micron. Observations can be made in liquids or in air where the particles must be fixed to a slide or substrate. Techniques such as scanning electron microscopy (SEM) or transmission electron microscopy (TEM) employ a beam of electrons in a way that is analogous to the way an optical microscope uses a beam of light to perform imaging. SEM/TEM techniques generally require extensive sample preparation and operate under vacuum. As SEM and TEM both use a beam of electrons, most preparations require either metal samples or metal coatings on the sample to prevent charring of the sample. Another sub-category of microscopy includes methods employing fluorescence. In these methods, the particles must be coated or impregnated with a fluorescent dye. Specific wavelengths of light are used to excite the fluorescence of these dyes (or molecules) such that only known spectrum of light is emitted. These techniques have found very successful and widespread applications in biology, but the challenge of chemically tagging or dyeing a particle involves an elaborate sample preparation and chemistry pathways. Additionally, obtaining the best possible spatial resolution using these techniques often requires the samples under observation to remain relatively static, further limiting industrial and commercial utility in time-sensitive or online applications.

Other techniques for particle sizing are generally based on flow (e.g. Taylor dispersion analysis, also called orifice plate methods), planewave light scattering/diffraction (e.g. dynamic light scattering or laser diffraction), or monitoring and quantifying the diffuse motion of particles in solution (e.g. nanoparticle tracking analysis, for example the Malvern NanoSight). These techniques usually explicitly assume spherical particles.

SUMMARY OF THE INVENTION

According to an aspect of the present invention, there is provided a method for characterising a sample located within an imaging region, the method comprising the steps of: generating one or more evanescent fields, each associated with a direction, within the imaging region; capturing an image of the imaging region; determining one or more sample characteristics of the sample according to a spatial intensity pattern resulting from an interaction between the, or each, evanescent field and the sample within the image.

In an embodiment, the one or more sample characteristics include one or more shape parameters. In an embodiment, the one or more sample characteristics include one or more size parameters.

In an embodiment, the intensity pattern comprises one or more local intensity maxima, and wherein the one or more sample characteristics are determined at least in part based on an identified location of the one or more local intensity maxima. The step of determining a size parameter and/or shape parameter of the sample includes determining a location of at least one surface of the sample based on at least one local light intensity maximum within the image.

Optionally, at least two evanescent fields are generated simultaneously and are each associated with a unique characterising spectrum. Also, or alternatively, according to an option, at least two evanescent fields are created according to a sequence, wherein the sequence includes at least one evanescent field generated after at least one other evanescent field. Each evanescent field is generated at a unique time such that no two evanescent fields are present within the imaging region at the same time.

The method may further comprise the steps of: identifying a plurality of local light intensity maxima associated with the evanescent fields; and determining sample size parameter(s) and/or shape parameter(s) consistent with the relative positions of the plurality of local maxima. Optionally, identifying a plurality of local maxima includes applying a filter for identifying a central location or locations of local maxima within the intensity pattern. A sample size parameter(s) and/or shape parameter(s) may be determined in dependence on the directions associated with each evanescent field.

Optionally, the image is captured by an image sensor coupled to an optical magnifier, such that the imaging region is viewable by the image sensor via the optical magnifier.

According to another aspect of the present invention, there is provided a sample characterising apparatus comprising an imaging sensor, an optical medium including a first surface above which a sample is positionable, and a plurality of light inputs each configured to direct light received by the light input into the optical medium from a unique direction such as to produce total internal reflection from the first surface when no sample is present, is wherein the imaging sensor is arranged to capture an image of a spatial intensity pattern due to a sample interacting with an evanescent field associated with each light input.

In an embodiment, at least one light input is controllable such that only one light input projects light into the optical medium at a time. Optionally, at least two light inputs are each associated with a unique characterising wavelength, and the imaging sensor is configured to image the first surface such that each light input is differentiable.

Each light input may be coupled to a light source. At least one light source may be a laser. At least one light source may be an LED light source—for example, the optical coupler may comprise the at least one LED light sources.

Optionally, for each light input, the angle at which light is projected into the imaging region is adjustable.

The apparatus may comprise a magnifier optically coupled to the imaging sensor, optionally wherein a magnification of the magnifier is adjustable.

According to yet another aspect of the present invention, there is provided a sample characterising system comprising the sample characterising apparatus of a previous aspect, the system configured to implement the method of a previous aspect.

As used herein, the word "comprise" or variations such as "comprises" or "comprising" is used in an inclusive sense, i.e. to specify the presence of the stated features but not to preclude the presence or addition of further features in various embodiments of the invention.

BRIEF DESCRIPTION OF THE DRAWINGS

In order that the invention may be more clearly understood, embodiments will now be described, by way of example, with reference to the accompanying drawing, in which.

DESCRIPTION OF EMBODIMENTS

Figure 1:
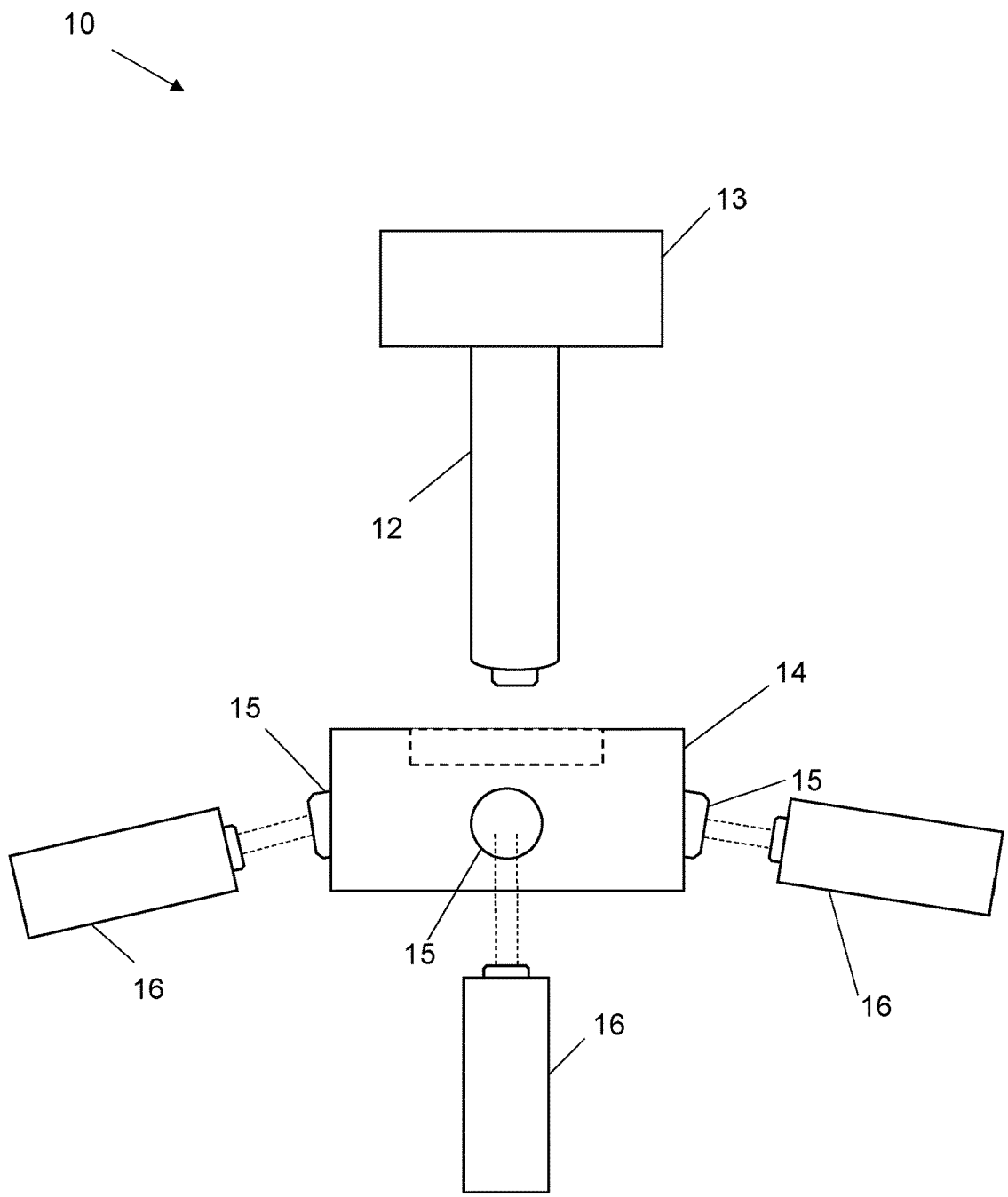
FIG. 1 shows an evanescent field imaging apparatus according to an embodiment.

FIG. 1 shows an evanescent field imaging apparatus (imaging apparatus) 10 according to an embodiment. The imaging apparatus 10 comprises an optical coupler 14 configured to accept a sample 50. The imaging apparatus 10 optionally also comprises a magnifier 12 comprising an arrangement of one or more lenses (not shown) optically coupled to an imaging sensor 13. The magnifier 12 can be, for example, a compound microscope. The imaging sensor 13 can be, for example, a digital camera or a custom designed imaging sensor. The optical coupler 14 defines an imaging region 11 in which the sample 50 is locatable. The imaging apparatus 10 also comprises one or more light inputs 15. The light inputs 15 are coupled to the optical coupler 14, for example: using fibre optic cables 22, via direction of one or more light beams (such as a laser beam(s)) through free air onto the light inputs 15, or with directly coupled light sources 16 such as LEDs provided with the optical coupler 14, to one or more light sources 16. In FIG. 1, each light input 15 is uniquely coupled to a light source 16 such that there is a different light source 16 for each light input 15. However, in other embodiments, one or more of the light inputs 15 are coupled to a common light source 16—these embodiments will be described in more detail below. At least one light source 16 can be a laser. In another embodiment, at least one light source 16 is a LED source. It is anticipated that two or more different types of light source 16 can be utilised; for example, both LED sources and laser sources.

Figure 2:
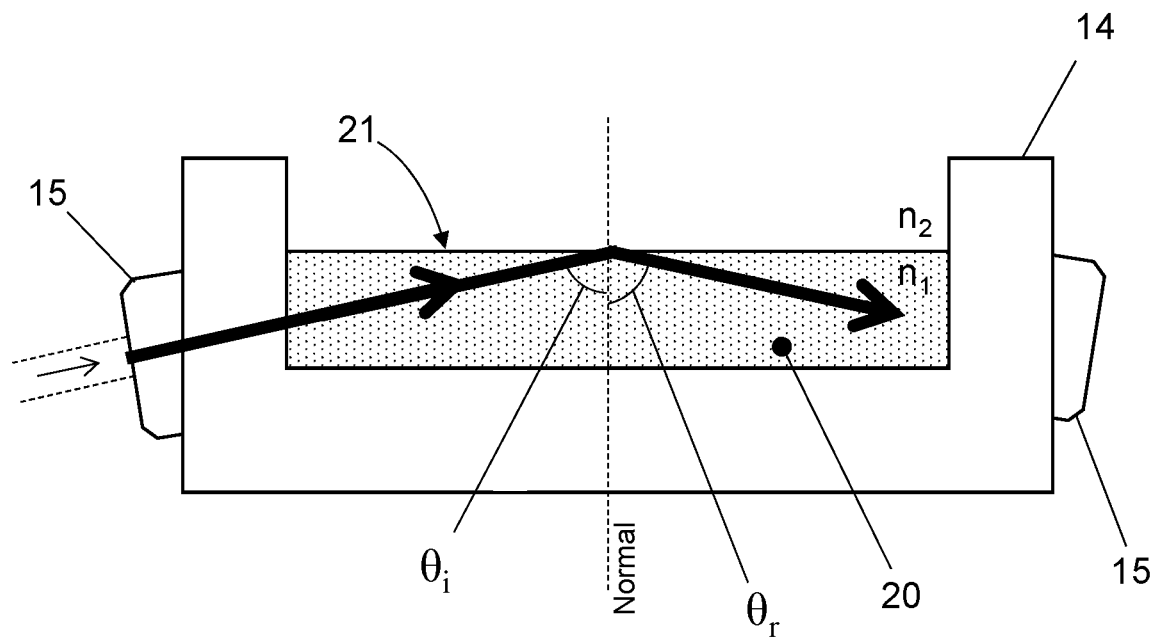
FIG. 2 shows a representation of total internal reflection.

Referring to FIG. 2, in an embodiment, the optical coupler 14 comprises an optical medium 20 having a first surface 21 above which the sample is located. The use of the term "above" is for ease of description and is intended to differentiate between the side of the first surface 21 in which the light from the light sources 16 is directed (i.e. "below" the first surface 21) and the opposite side of the first surface 21 (i.e. "above" the first surface 21). It should be noted that only two light inputs 15 are shown for ease of illustration, however, generally the optical coupler 14 is configured to direct light received by the one or more light inputs 15 into the optical medium 20 in a manner suitable for creating an evanescent field above the first surface 21. In an embodiment, the optical coupler 14 is configured to receive light from a plurality of light inputs 15 and to direct at least a portion of the received light towards the first surface 21 of the optical medium 20. The evanescent field(s) located above the first surface 21 decay(s) exponentially with distance from the first surface 21. Reference herein to evanescent field "penetration" refers to the distance from the first surface 21 for which the evanescent field is capable of interacting sufficiently with the sample 50 to produce an imageable or observable effect. Thus, where reference is made to increasing the penetration depth of the evanescent field, the reference means increasing the magnitude of the evanescent field at a particular (usually arbitrary) distance from the first surface 21.

FIG. 2 also includes a representation of total internal reflection of light emitted towards the surface 21. The figure illustrates two relevant angles: $\theta_i$ being the angle of incidence, and $\theta_r$ being the transmitted angle. The angles $\theta_i$ and $\theta_r$ are with respect to the is normal to surface 21. The optical medium has a refractive index $n_i$ and the sample region has a refractive index $n_2$. For angles of incidence $\theta_i$ larger than a critical angle $\theta_c$, total internal reflection will occur. The critical angle can be calculated according to:

$$\theta_c = \sin^{-1}\left(\frac{n_2}{n_1}\right) \quad \text{EQ 1}$$

Each of the angles $\theta_i$, $\theta_r$, and $\theta_c$ are defined as the angle between the relevant ray and the normal to the surface 21 (as shown). For angles of incidence larger than the critical angle, $\theta_i = \theta_r$.

The sample 50 in a broad sense corresponds to features to be imaged by the imaging apparatus 10. For example, the sample 50 can correspond to a single particle. In another example, the sample 50 comprises a plurality of individual particles. In yet another example, the sample 50 comprises surface features of a substrate—this can include surface features such as indents and protrusions. In a particular example, surface features of the first surface 21 of the optical medium 20 may be imaged (in this case, the optical medium 20 can also be considered the sample 50). The sample 50 is located within a sample medium, which, depending on the experimental arrangement, can be a vacuum (i.e. for the purposes of this disclosure, a vacuum is considered a type of sample medium) or air (i.e. with a refractive index $n_2 \approx 1$), or can be any fluid or solid medium (as shown in FIGS. 1 and 2) having a refractive index $n_2 > 1$. It is preferred that the sample medium has a refractive index lower than that of the optical medium 20 (i.e. $n_2 > n_2$) to enable total internal reflection when light is incident on the surface 21 at angles of incidence exceeding the critical angle. Also, for the purposes of this disclosure and simplicity of language and unless otherwise noted, it is assumed that the sample 50 comprises a single particle.

It should be generally understood that the imaging sensor 13 can be configured to obtain a single image comprising all imaged features or a series of composite images which are subsequently combined to produce an image of the imaging region 11. For example, in the latter case, individual light sources 16 are associated with unique wavelength spectra, and the imaging sensor 13 includes a plurality of sensors each uniquely associated with a light source 16 and configured to receive light associated with the light source 16. In another example, a time series of composite images is combined to form the image. It is also understood that the image may be suitable for later decomposition into a plurality of composite images.

In an embodiment, the optical coupler 14 provides fixed angle coupling. That is, the coupling angle is fixed and selected such as to provide for total internal reflection for expected combinations of sample medium refractive index and optical medium 21 refractive index. In another embodiment, the optical coupler 14 provides modifiable angle coupling for each light input 15. For example, mechanically or electrically actuated means may be provided for changing the coupling angle(s) for each light input 15 such as to enable variation in the angle(s) of incidence. In another example, moveable prisms may be utilised to adjust the direction of direction of the light into the optical medium 20. This may be beneficial, for example, as it may enable adjustment of the angle of incidence to adjust the penetration depth and/or position of the evanescent field.

Figure 3A:
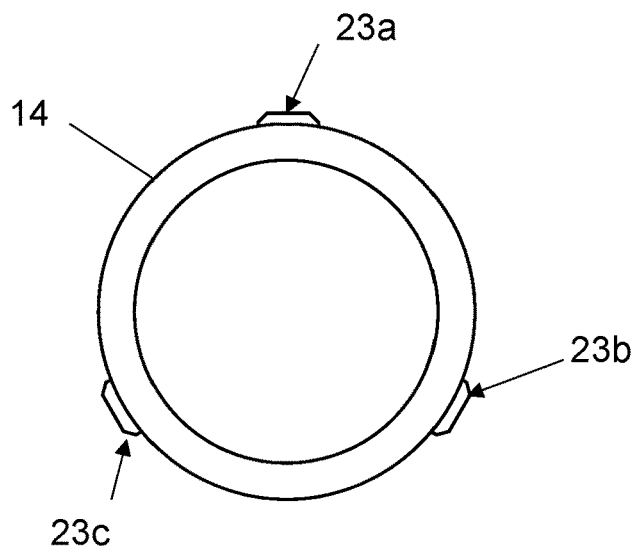
FIG. 3A shows an optical coupler having three coupling points.
Figure 3B:
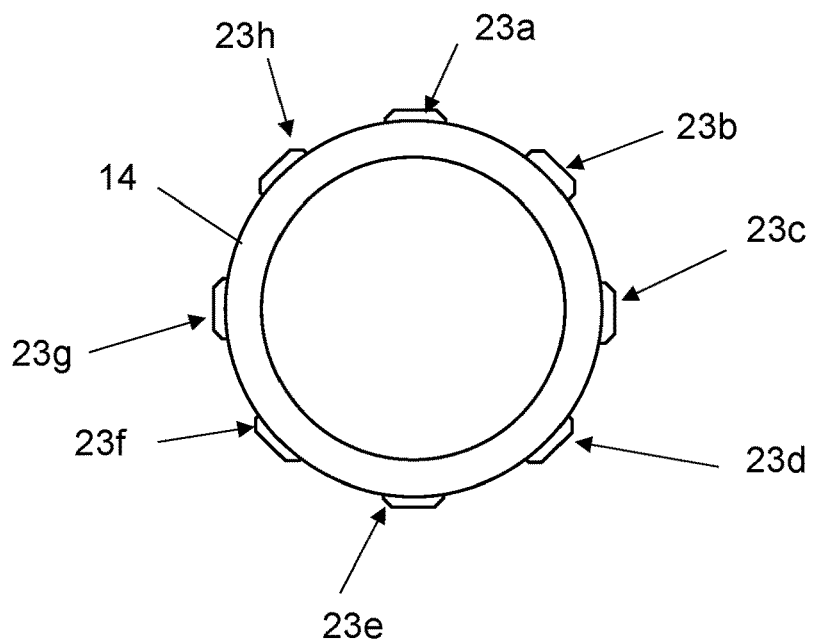
FIG. 3B shows an optical coupler having eight coupling points.

FIGS. 3A and 3B show top-down views of the optical coupler 14 according to two embodiments. The optical coupler 14 includes a plurality of coupling points 23 for coupling to the light inputs 15. In one embodiment, there are three coupling points 23a-23c as shown in FIG. 3A. In another embodiment, there are more than three coupling points 23, such as the eight coupling points 23a-23h shown in FIG. 3B. Generally, it may be preferred that the coupling points 23 be located at equal spacings around the optical medium 20.

Generally, each coupling point 23 is associated with a unique light input 15. For example, in FIG. 3A there are light inputs 15A-15C respectively associated with coupling points 23a-23c and in FIG. 3B there are light inputs 15A-15H respectively associated with coupling points 23a-23h. In these embodiments, a light absorbing baffle region 24 is provided on the first surface 21 of the optical medium 20. The baffle region 24 is configured to block light emitted from the light inputs 15, which is incident upon the first surface 21 at an angle below the critical angle ($\theta_c$), from entering the imaging region 11. In one implementation, the baffling region 24 material is coloured black (or has a black appearance) as it is configured to absorb a broad spectrum of radiation. Typically, the baffle region 24 is utilised when the light emitted by the light inputs 15 is not collimated in order to reduce the amount of light incident at an angle below the critical angle ($\theta_c$) that may be present in the imaging region.

For the purposes of this disclosure, a general feature shown in the figures is represented by a numerical reference—for example, the coupling points 23 of FIGS. 3A and 3B. Such references, where appropriate, are common amongst the figures. Where reference to specific instances of a feature is desirable, a lowercase letter suffix is appended to the numerical reference—for example, FIG. 3A shows coupling points 23a, 23b, and 23c.

Figure 3C:
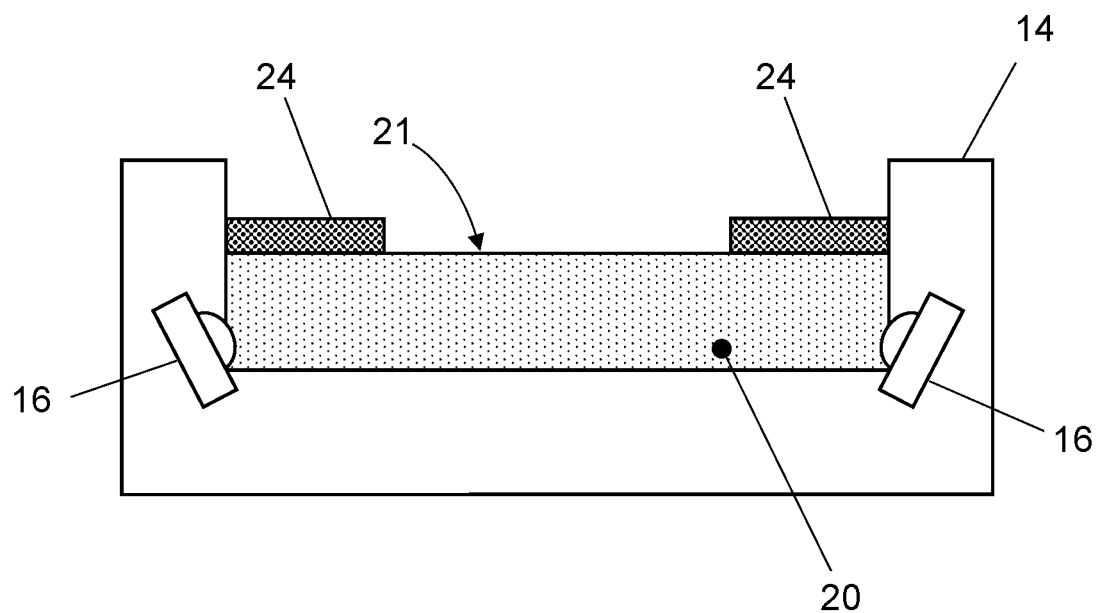
FIG. 3C shows an embodiment wherein the light sources are components of the optical coupler.

FIG. 3C shows an embodiment wherein the light sources 16 themselves are components of the optical coupler 14—typically, each light source 16 is secured within a body of the optical coupler 14. The light sources 16 may be fixed within the optical coupler 14 or may be removable (such as to make the light sources 16 replaceable). In the implementation shown, the light sources 16 are LEDs, and there is a separate LED light source 16 for each light input 15. Depending on the embodiment, the LED light sources 16 may emit different spectra or may emit the same spectra. An LED light source 16 can be configured to emit a single spectrum (i.e. a single "colour") or a plurality of spectra (i.e. two or more "colours" as in the case of a multi-die LED). The LED light sources 16 may emit non-collimated light, and therefore, the optical coupler 14 according to the present embodiment will typically incorporate a baffle region 24. The optical coupler 14 may include an electrical interface 25 enabling a power supply to be connected to each light source 16.

The electrical interface 25 can be implemented as a single point of connection as shown or as multiple points (e.g. a connection point for each light source 16).

In an implementation of FIG. 3C, each light source 16 produces substantially the same light spectrum. According to this implementation, each light source 16 is independently controllable such that each light source 16 can be in an emitting or non-emitting state independently of the other light sources 16. For example, the electrical interface 25 can include a control line for each light source 16 as well as a common ground line (for example). In another implementation of FIG. 3C, each light source 16 produces a unique light spectrum, which may be either continuous or discrete. According to this implementation, each light source 16 may be independently controllable such that each light source 16 can be in an emitting or non-emitting state independent of the other light sources 16. However, in another option, each light source 16 is commonly controlled (i.e. each light source 16 is either emitting or non-emitting at the same time). For example, in this latter case, the electrical interface 25 can comprise a common control line as well as a common ground line (for example). The control lines may be connected to a controller which may be, for example, a computer 17 as described below. Alternatively, the controller may be a specifically programmed microcontroller, such as an ATMega2560 microcontroller.

Figure 3D:
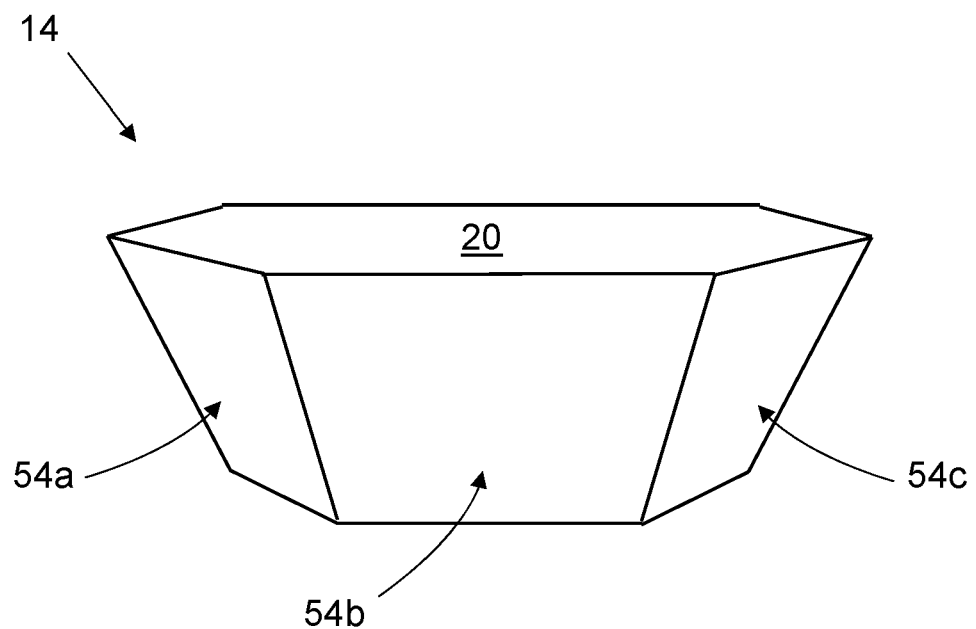
FIG. 3D shows an embodiment wherein the optical coupler includes a plurality of facets.

In an embodiment, the optical medium 20 of the optical coupler 14 includes a plurality of facets defining the sides of the optical coupler 14, as shown in FIG. 3D. In the example shown, there are six facets 54a-54c (three are obscured and not labelled in the figure), however, generally, any useful number of facets may be utilised. Light from light sources 16 (which may preferably be collimated) may be directed at the facets 54a-54c. The optical coupler 14 of this embodiment defines a prismatic structure. The facets 54 can therefore be considered to be the light inputs 15, with the angles of the facets 54a-54c and/or angle at which light is directed towards the facets 54a-54c selected such as to cause total internal reflection at the first surface 21. The optical coupler 14 can include opaque regions as required (e.g. covering the first surface 21 except in a sample 50 location area of the first surface 21).

Figure 4A:
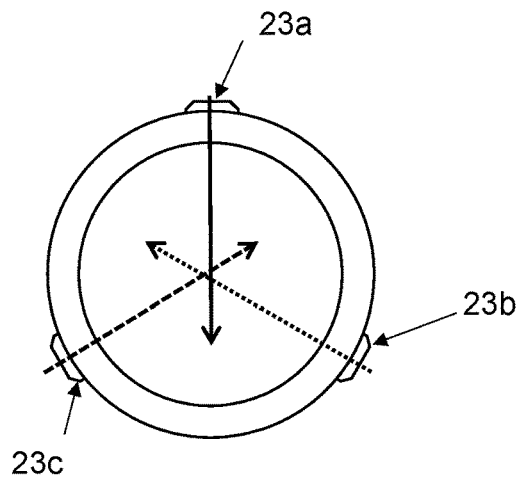
FIG. 4A shows the operation of an imaging apparatus according to an embodiment without a sample present, wherein each light source is associated with a unique characterising wavelength.
Figure 4B:
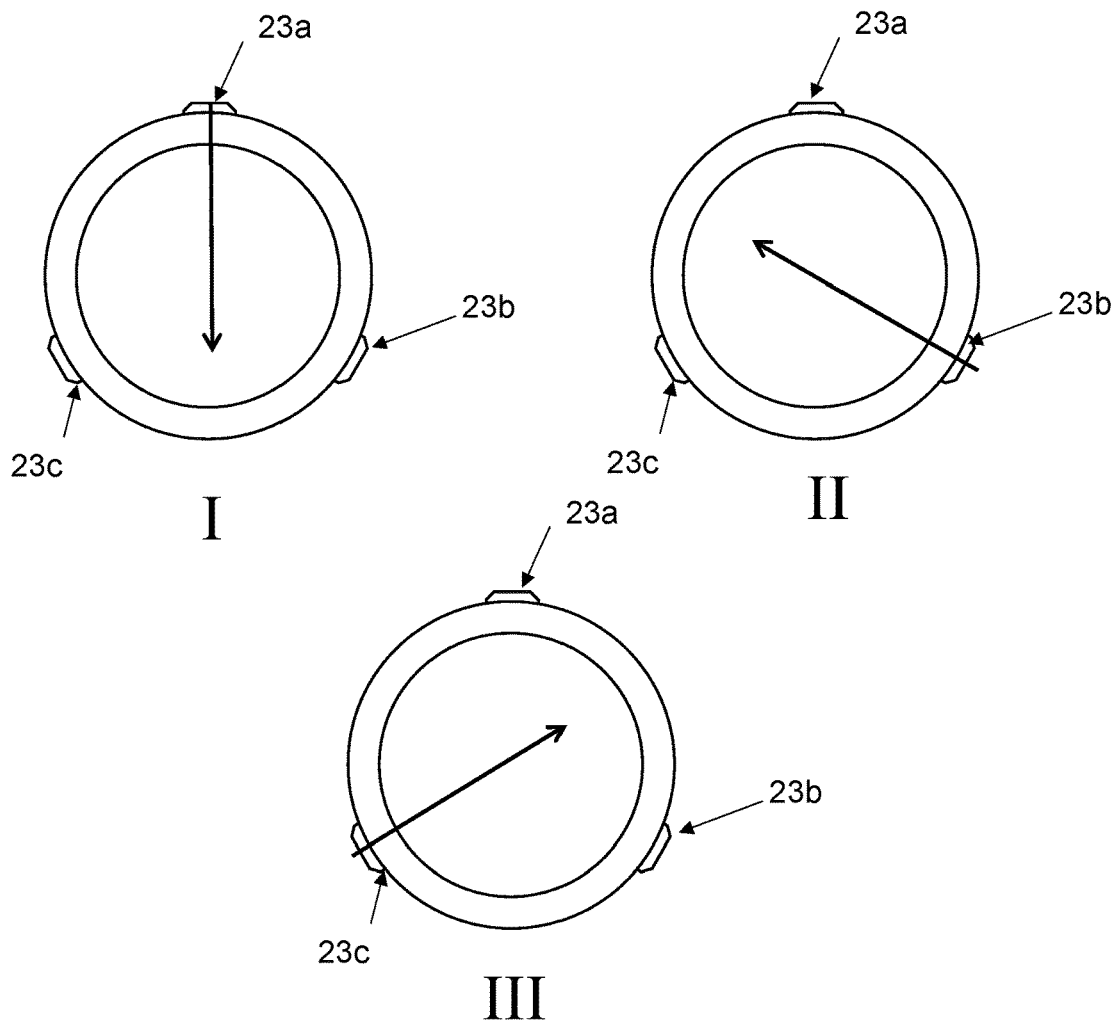
FIG. 4B shows the operation of an imaging apparatus according to an embodiment without a sample present, wherein each light source is associated with a unique temporal position.

FIGS. 4A and 4B depict the operation of an imaging apparatus 10 according to two embodiments, in each case without a sample being present within the imaging region 11, with respect to the three-coupling points 23a-23c implementation of FIG. 3A. In FIG. 4A, each light source 16 (not shown in the figure) is associated with a unique spectrum—it may be preferred that the spectra are substantially non-overlapping—and therefore each light source 16 is activated simultaneously (indicated by the arrows). In FIG. 4B, each light source 16 (not shown in the figure) produces the same (or similar) spectra, however, the light sources 16 are switched such that only one light source 16 is illuminated at a time. FIG. 4B shows illumination within the imaging region 11 at three separate time intervals (as indicated by the arrows). In an embodiment (not shown), each light source 16 is associated with both a unique spectrum and a unique point in time. In both FIGS. 4A and 4B, each coupling point 23 is associated with a channel—in FIG. 4A channels are primarily characterised by the spectra of the light source 16 and in FIG. 4B channels are primarily characterised by the time period in which the corresponding light input 15 is activated.

As described with reference to FIG. 1, the imaging region 11 is imaged by the imaging sensor 13, optionally via magnifier 12. With no sample 50 present, it is expected that little to no light emitted by the light sources 16 is imaged by the imaging sensor 13, due to the total internal reflection (it is understood that some of the emitted light may be imaged due to, for example, reflections within the optical coupler 14 or light leakage).

Figure 5A:
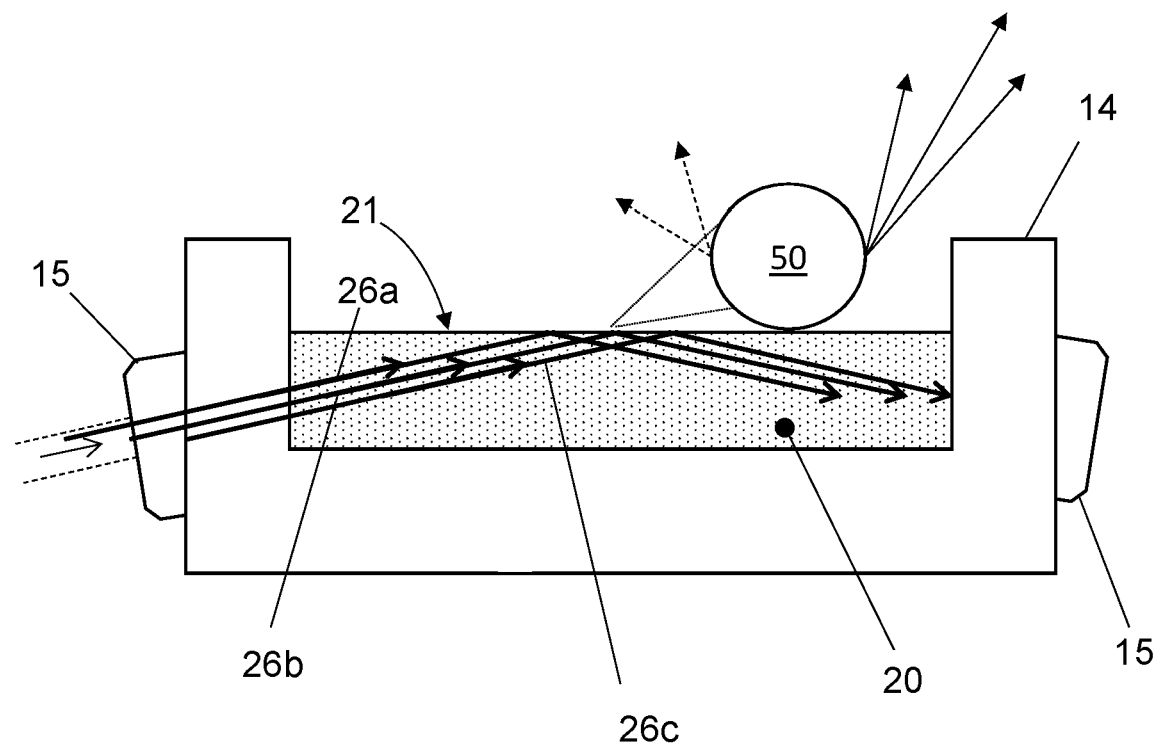
FIG. 5A shows an example of a sample being illuminated due to an interaction with the evanescent fields, according to an embodiment.
Figure 5B:
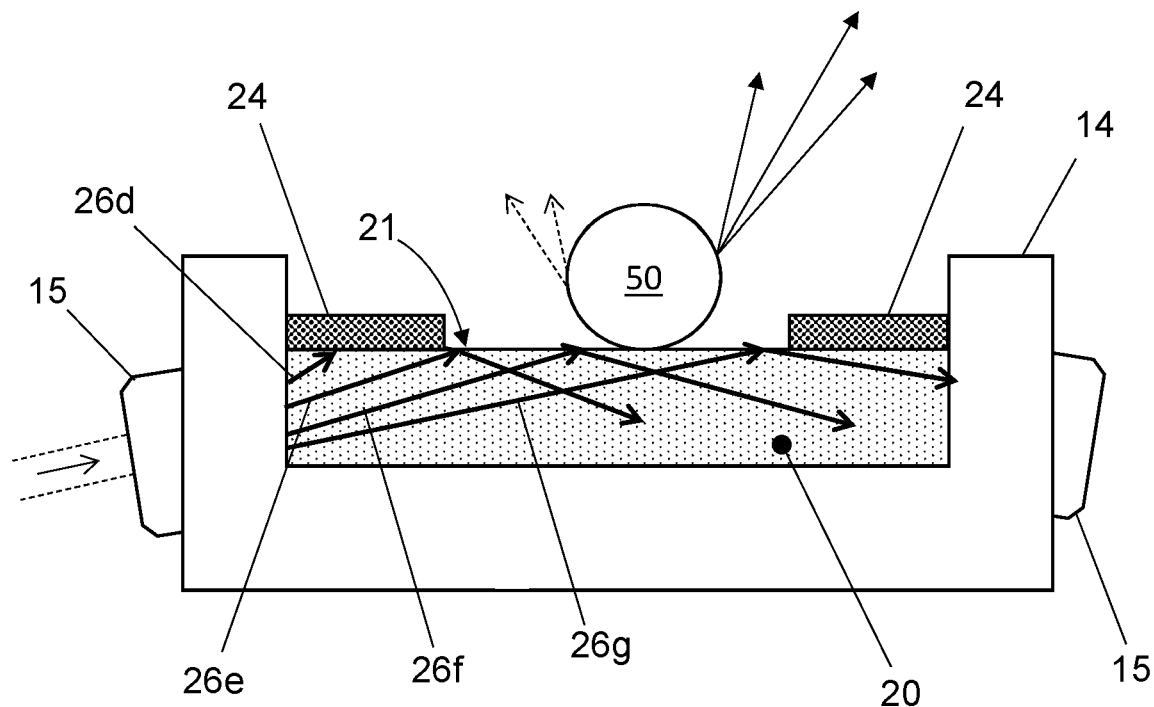
FIG. 5B shows an example of a sample being illuminated due to an interaction with the evanescent fields, wherein the embodiment comprises a baffle region.

Referring to FIGS. 5A and 5B, a sample 50 is shown present within the imaging region 11 of the optical coupler 14. For the purposes of illustration, the sample 50 is shown as a simple sphere (i.e. having a circular cross-section as shown). FIG. 5A shows a collimated light rays 26a, 26b, 26c from one light source 16 being emitted into the optical medium 20 via light input 15, and the light rays 26a-26c being reflected at the first surface 21. FIG. 5B shows a non-collimated light rays 26d, 26e, 26f, 26g from one light source 16 being emitted into the optical medium 20 via light input 15, and light being reflected at the first surface 21—as can be seen, each illustrated light ray 26d-26g follows a different path. Light ray 26d is following a path that would not result in total internal reflection at the first surface 21 but is absorbed (or at least substantially absorbed) by baffle region 24. Light rays 26e-26g, however, do undergo total internal reflection at the first surface 21. Of course, the light rays 26a-26g are merely illustrative. The baffle region 24 may be annular or may define a border mirroring the shape of the imaging region 11.

A portion of the light incident onto the first surface 21 which would normally have undergone total internal reflection (e.g. in the case shown in FIGS. 4A and 4B) is in fact scattered by the sample 50—the effect is as if the incident light is transferred via the evanescent wave to the sample 50. Typically, the scattering is brightest (or strongest) at the surface boundary of the sample 50. Thus, the total internal reflection is now frustrated due to the presence of the sample 50. The resulting image shows a variation of detected intensity accord the imaging region 11—this is referred to herein as an "intensity pattern"—which can be interpreted to determine one or more sample characteristics of the sample.

Without being bound to any particular theory, it is believed that an evanescent field generated in the region of the sample 50 interacts with the sample 50, resulting in light emanating from the sample 50 that is correlated with the location of the surface(s) of the sample 50.

Figure 6A:
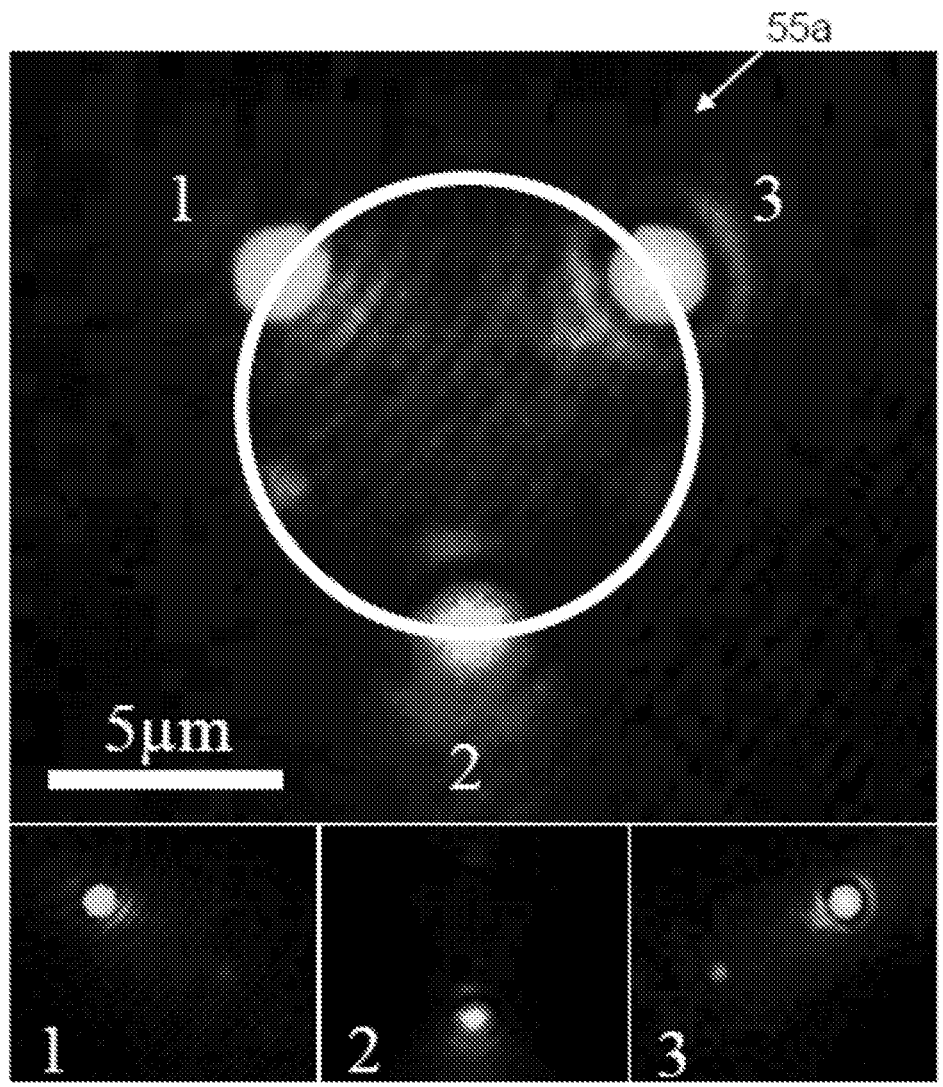
FIG. 6A shows an example of a substantially spherical sample imaged by the imaging device of an embodiment.

FIG. 6A shows an image 55a of a substantially spherical sample 50 with a diameter of approximately 5 microns. The sample 50 is illuminated by three light sources 16a-16c arranged with approximately equal angular spacing around the sample 50a, each light source 16a-16c associated with a different characterising spectrum. FIG. 6C shows an image formed by the imaging apparatus 10 with three light sources 16a-16c interacting with the sample 50a from three different angular directions. The resulting intensity pattern comprises diffraction patterns associated with each illumination direction, corresponding to approximately concentric rings surrounding a bright centre. In this case, sample characteristics such as the size and/or shape of the sample 50a can be estimated by determining and interpreting the relative location of the central "bright spot" for each of the three diffraction patterns. Thus, sample characteristics such as size parameters and/or shape parameters may be estimated despite diffraction limit considerations that may be applicable to directly imaging the sample 50a. It should be noted that the presence and extent of diffractive effects may be dependent on the spectrum of the light source(s) 16, and the properties of the lenses of any magnifier 12 (for example, the numerical aperture). Under certain conditions for some samples 50, local intensity variations resulting from a sample interacting with a single light source may be used to locate a plurality of surface features on a sample (for example local maxima or "bright spots" associated with at least two points on the surface of a sphere that may be used to determine radius). Inserts 1-3 show the individual bright portions of the intensity pattern of image 55a.

Figure 6B:
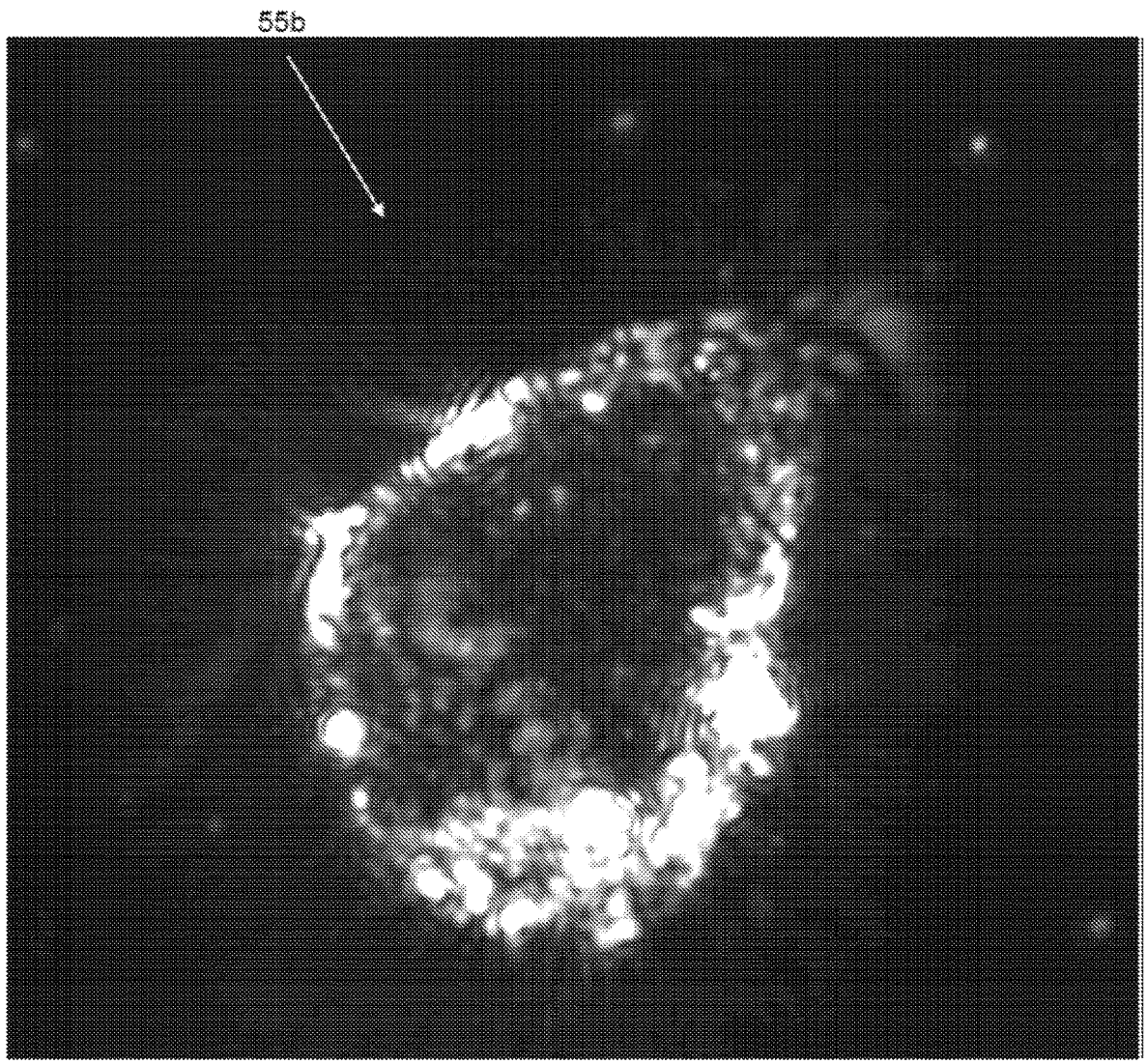
FIG. 6B shows an example of a sample with an irregular shape imaged by the imaging device of an embodiment.
Figure 6C:
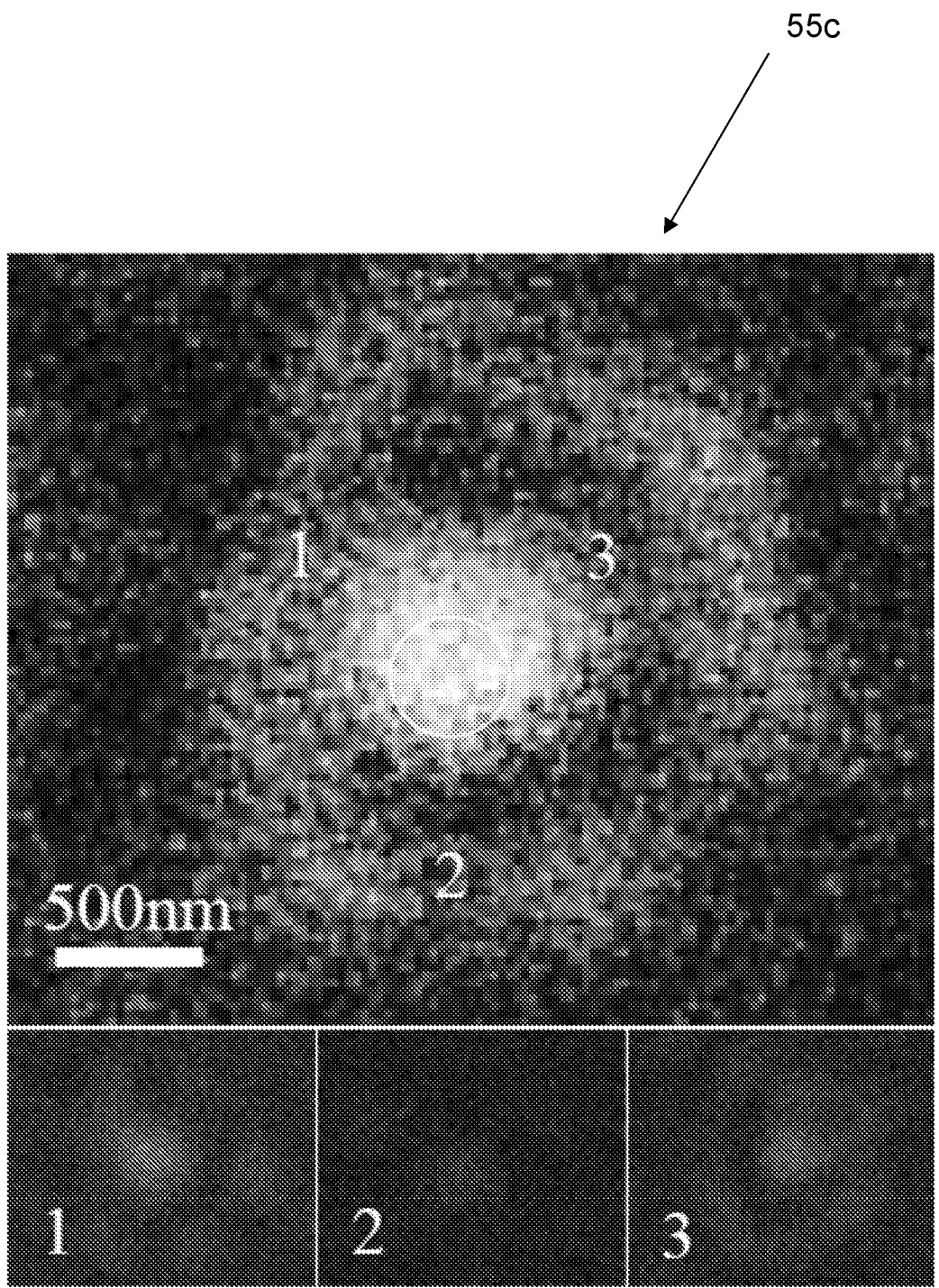
FIG. 6C shows an example of a sample showing characterising of a sample where the image highlights diffractive effects, according to an embodiment.

FIG. 6B shows an image 55b of another sample 50 having an irregular shape. However, the same principle applies as for the spherical particle 50 in FIG. 6A—the intensity pattern can be directly or indirectly determined as corresponding to the surface portion at that location on the sample 50*b*.

An intensity pattern can be characterised by an intensity pattern comprising local intensity maxima—i.e. the maximum intensity with a localised region. Such local intensity maxima can represent, for example in some cases, the actual location of a surface of the sample 50. However, in other cases, the local intensity maxima are correlated with the location of the surface of the sample 50, and a known adjustment can be applied to identify the surface location. It should be understood that the intensity pattern is a spatial pattern—it varies over the imaging region 11.

Under certain conditions, sample characterises such as size parameters and/or shape parameters of a sample 50 may be determined by identifying and interpreting local intensity maxima—for example, the centre of each (or at least one or more, usually a plurality) bright region within the image 55 or the centre of each (or at least one or more, usually a plurality) bright region within a series of images of sample 50 (subject to the same or different evanescent field(s)) combined to form image 55.

In FIG. 6A, this is relatively trivial due to the nominally spherical shape of the sample 50. The size of the sample 50 may be such that under certain conditions bright regions associated with a plurality of light sources 16 are relatively simple to isolate even when multiple light sources are simultaneously interacting with the sample 50 to produce an imageable effect, and no chromatic or temporal mechanism is in place to separate light emanating from the sample 50 according to the light source 16 associated with it.

In FIG. 6A, this is relatively simple to account for as each bright region is substantively far enough away from each other bright region such that the approximate centre of each diffraction pattern can easily be identified. In FIG. 6B, the bright regions can be interpreted with enough clarity to obtain an indication of shape parameters and size parameters of the sample 50 as diffractive effects are minimal.

Referring to FIG. 6C, an image 55*c* is shown of a sample 50 with significant overlap in the diffraction patterns associated with three light sources 16. A filtering procedure may be applied in order to isolate and identify each individual diffraction pattern and therefore the centre of each pattern. This filtering procedure may include physical techniques for separating light associated with each light source (for example via temporal sequencing or chromatic filtering) and may also include interpretation techniques applied during the analysis of resulting images. More generally, a filter may be utilised to assist in identifying is local intensity variations associated with edges/surfaces of the sample 50. Alternatively, a user may utilise their judgement to interpret resulting images (for example when performing qualitative imaging, or when attempting to obtain an approximate estimate of a size parameter, or when attempting to determine the approximate shape of the sample 50). An advantage of an embodiment of the present description may be that it provides means to image or characterise small samples 50 which would otherwise be overly blurred due to diffractive effects. Inserts 1-3 show certain portions of the spatial intensity pattern of the image 55*c*.

In an embodiment, the imaging sensor 13 is configured to continually (e.g. periodically) capture images of the imaging region 11 and to transmit the captured images to the computer 17. The computer 17 includes a display 30 for displaying a graphical user interface (GUI). The GUI may be configurable to update on reception of a new image captured by the imaging sensor 13 to display the new image (typically the new image may replace a previously displayed image, or may be displayed alongside previously displayed images, or may be used to form a composite image based on a plurality of images of the imaging region 11). Therefore, the computer 17 can be effectively configured to display an up-to-date representation of the illuminated sample 50 and may also provide tools to analyse images of the imaging region 11.

In an embodiment, the computer 17 or other control system is interfaced with the light input(s) 15 such that one or more output parameters of the light input(s) 15 can be adjusted through commands communicated from the computer 17 or other control system to the light input(s) 15. For example, the intensity of the light inputs 15 may be adjustable in this manner. Furthermore, the on/off state of the, or each, light input 15 may be set by a command sent from the computer 17 or control system.

In another embodiment, the light input(s) 15 are interfaced with a controller 19 which is configured to control one or more parameters of the light input(s) 15. The controller 19 itself may be interfaced with the computer 17 such that the computer 17 causes the controller 19 to operate in a particular manner. For example, the controller 19 may automatically control the light input(s) 15 in accordance with a mode selected from a plurality of modes by the computer 17.

In a more general sense, in an embodiment, the computer 17 is configured to control the light input(s) 15 and/or the light sources 16 and/or the imaging sensor 13 to implement the processes described herein. The computer 17 can be a general-purpose computer interfaced with a controller 19 or can be directly interfaced with the relevant components of the system 10.

In an embodiment, the imaging sensor 13 corresponds to an RBG sensor (e.g. the imaging sensor 13 is a component of a digital camera that may be mounted to a magnifier 12). The RGB sensor may be particularly useful for imaging a sample 50 where the light sources 16 comprise a plurality of substantially red, blue, or green wavelengths—for example, each light source 16 may have the substance of its spectrum selected to overlap preferentially with detection sensitivity of one or more particular elements of the colour filter array of the RGB sensor. The use of an RGB sensor and corresponding light sources 16 may then provide an advantage in that the image(s) produced by the imaging sensor 13 may in some cases be more easily decomposed to associate bright regions of distinct substantive wavelengths with their respective light sources 16.

In some cases, cross-talk between adjacent sub-pixels of the RGB sensor (for example, an RGB sensor with Bayer configuration) may introduce error when determining sample characteristics such as size parameters and/or shape parameters of a sample 50. According to an embodiment, a deconvolution filter may be applied to the signal generated by the RGB imaging sensor 13 (e.g. the image data obtained corresponding to the image 55). The deconvolution filter may be configured based on known cross-talk properties of the RGB sensor (e.g. the sensitivity of a red sub-pixel to the relevant spectra of red, green and blue incident light) to calculate (or estimate) the light associated with each of the relevant light sources 16 incident on at least one physical pixel of the imaging sensor 13, approximately independent of other spectra also incident on the same physical pixel(s) of the imaging sensor 13.

Figure 7:
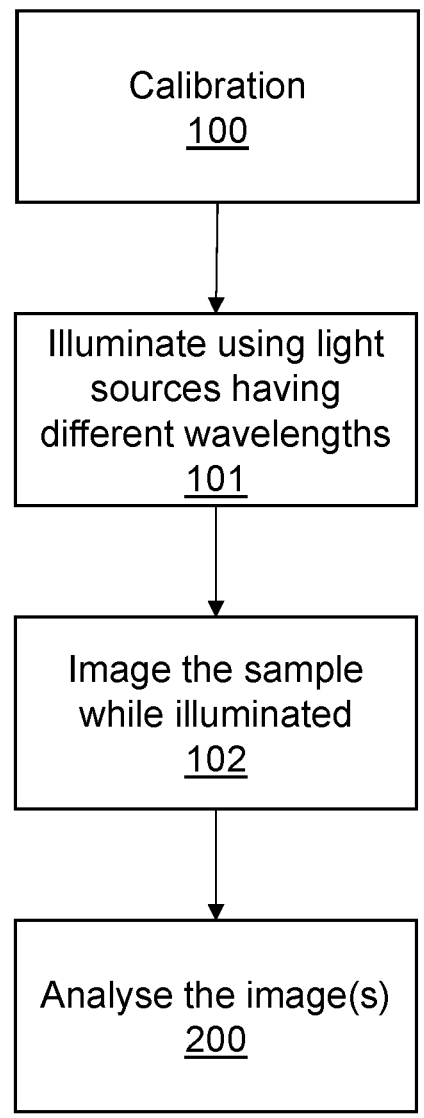
FIGS. 7 and 8 show example methods for operating the imaging device according to embodiments.

FIG. 7 shows a method for operating the imaging apparatus 10 to take measurements of a sample 50 positioned on a sample substrate 51 and within a sample medium 52 (which may be vacuum, air, or some other medium). The sample 50 is located within the imaging region 11. An initial calibration step 100 may be required, as shown in FIG. 7. The calibration step may include, for example, making necessary focusing adjustments to any magnifier 12 that may be used. According to the present embodiment, each light source 16 may be associated with a unique characteristic spectrum (e.g. refer to FIG. 4A). At illumination step 101, the optical medium 20 is illuminated with at least two of the light sources 16 simultaneously. As previously described, it is expected that most of the incident light will undergo total internal reflection at the surface 21. In an embodiment, ideally only totally internally reflected light rays would be propagated through the optical medium. In proximity to the sample 50, light incident on surface 21 at an angle matching or exceeding the critical angle for total internal reflection at this surface may undergo frustrated total internal reflection, and a portion of the incident light may be transmitted to surfaces of the sample 50 producing scattering from the sample 50.

At imaging step 102, an image of the imaging region 11 is captured using the imaging sensor 13. The imaging sensor 13 may be coupled to a computer 17 (or other processing device) and/or directly to a storage medium such as a non-volatile memory 18 (e.g. a FLASH memory). The imaging sensor 13 is configured such as to allow for differentiation in the captured image between each of the characterising spectra—for example, the imaging sensor 13 may comprise an RGB sensor. The captured image therefore includes information indicating light intensity and light wavelength. The image 55 is then analysed at analysis step 200 (described in more detail below).

Figure 8:
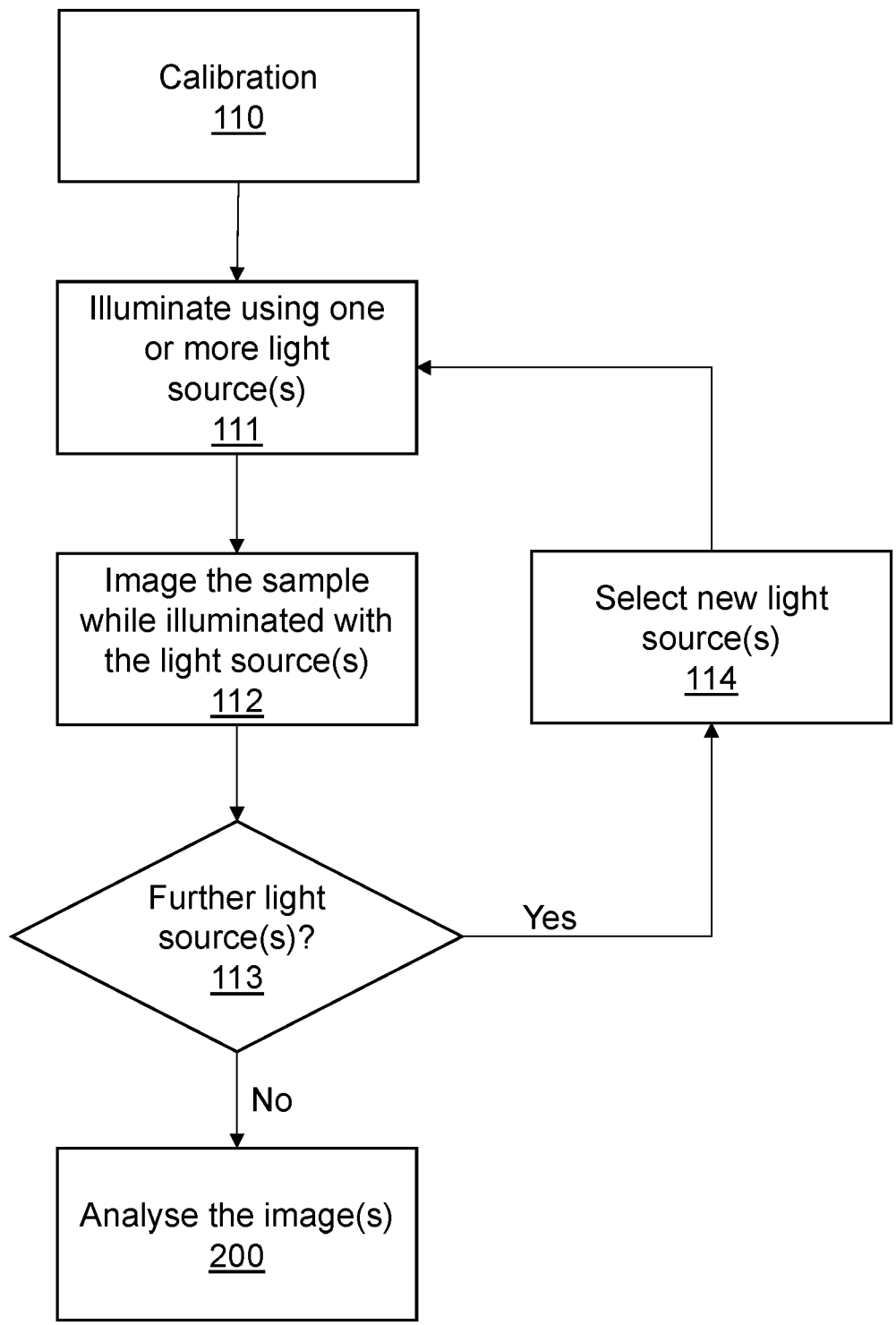

FIG. 8 shows another method for operating the imaging apparatus 10 to take measurements of a sample 50 positioned on a sample substrate 51 and within a sample medium 52 (which may be a vacuum, air, or some other medium). The sample 50 is located within the imaging region 11. An initial calibration step 110 may be required, as shown in FIG. 7. The calibration step may include, for example, making necessary focusing adjustments to any magnifier 12 that may be used. According to the present embodiment, each light source 16 is associated with a temporal position. At illumination step 111, the optical medium 20 may be illuminated with at least one of the light sources 16. As previously described, it is expected that substantially all of the incident light will undergo total internal reflection at the first surface 21. In proximity to the sample 50, light incident on surface 21 at an angle matching or exceeding the critical angle for total internal reflection at this surface may undergo frustrated total internal reflection, and a portion of the incident light may be transmitted to surfaces of the sample 50 producing scattering from the sample 50.

The methods of FIG. 7 and FIG. 8 may effectively be combined, such that a sequence of illuminations occurs wherein at least one step in the sequence comprises at least two light sources illuminating the optical medium 20 simultaneously with different unique characterising spectra. For example, a sequence of illuminations may occur where, in each step in the sequence, the optical medium 20 is illuminated with three light sources 16 corresponding to red, green, and blue. Preferably, each illumination is from a unique angle. For example, if each sequence step illuminates with three light sources 16, and there are four steps in the sequence, the optical medium 20 is illuminated from twelve different directions (viz. four sequence steps multiplied by three angles of illumination per step).

At imaging step 112, an image of the imaging region 11 is captured using the imaging sensor 13. The imaging sensor 13 may be coupled to a computer 17 (or other processing device) and/or directly to a storage medium such as a non-volatile memory 18 (e.g. a FLASH memory). The captured image is associated with the temporal position.

At step 113, the method checks whether all of the light sources 16 have been imaged. If not, the method moves to step 114 wherein a new light source 16 is selected and then back to step 111 where the imaging region 11 is illuminated with the newly selected light source 16. Step 112 is repeated with the captured image being associated with the new temporal position associated with the newly selected light source 16. If yes, then the images 55 are then analysed at analysis step 200 (described in more detail below).

Step 200 corresponds to analysis of the image(s) 55 obtained according to FIG. 7 or 8. Generally, whether one image 55 or multiple are captured, the analysis may proceed on the basis that each light source 16 may illuminate the sample 50 from a different direction. Thus, each of the scattering maxima (or other distinguishing intensity variations) associated with the sample 50 is associated with a particular light source 16 and direction. There may be overlap in scattering patterns associated with different light sources 16. Multiple images 55 may be combined into a single image 55 and with artificial colouring (for example) may be assigned to the contribution of each image.

According to an embodiment, under certain conditions sample characteristics such as size parameters and/or shape parameters of a sample 50 may be determined by identifying and locating imaged maxima—this can be performed for example by a user viewing the image 55 or using software configured to identify such maxima.

According to an embodiment, where diffractive or light-scattering effects must be accounted for, an analysis may proceed on the basis of local maxima of light intensity in an image 55. A suitable filter or processing step may be required in order to accurately characterise different local maxima—for example, one or more parameters may be adjusted in order to determine the position of local maxima within the image(s) 55 relative to the size parameter(s) and/or shape parameter(s) of sample 50. These local maxima correlated with the surface (or at least one or more regions of the surface) of the sample 50. A user may be enabled to identify sample 55 sample characteristics such as size parameters and/or shape parameters, or software may be utilised for this purpose.

In a more general sense, the obtained image data may be put through an equipment processing filter step. The purpose of this step is to modify the data based on known properties of the imaging apparatus 10. For example, diffractive effects may be accounted for based on known properties of the detector optics (e.g. the numerical aperture of an objective). Also as previously discussed, account may be taken of any cross-talk between colour sub-pixels of the colour filter array in an RGB imaging sensor 13.

Furthermore, a sample processing filter step may be utilised. The purpose of this is to account for known properties of the sample 50. For example, it may be known that for a particular sample 50, the local maxima are displaced with respect to a sample surface. The step may therefore account for this by effectively "moving" the determined sample surface, thereby affecting a subsequent interpretation and characterisation of the sample 50.

Sample characteristics such as shape parameter(s) and/or size parameter(s) of the sample 50 may be determined based on the local maxima as shown in the image when accounting for the magnification of any magnifier 12 that may be used, and the resolution of the imaging sensor 13. From these details, distances may be determined within the image between local maxima.

Figure 9:
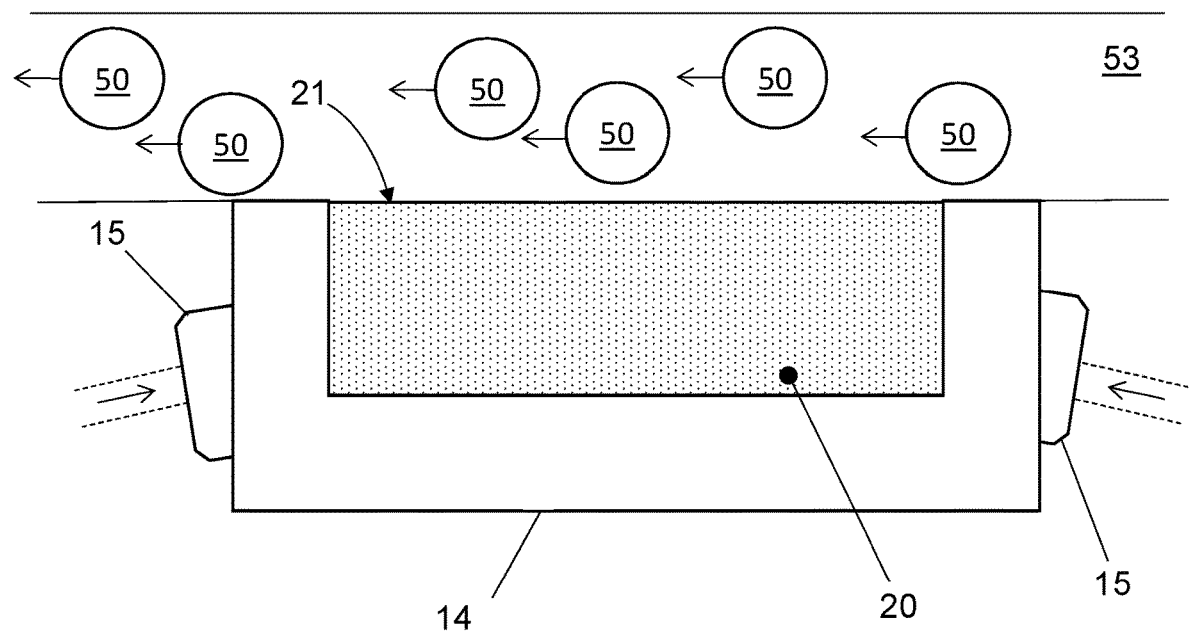
FIG. 9 shows an embodiment wherein the particles of the sample move across the imaging region.

In an embodiment, as shown in FIG. 9, the sample 50 comprises particles contained within a fluid 53 (e.g. a gas such as air or a liquid such as water), where the fluid 53 is moving with respect to the imaging region 11—therefore, the particles are also moving with respect to the imaging region 11. The fluid 53 may be contained within guide means (e.g. a pipe or fluid cell)—this is not shown. The imaging apparatus 10 may be utilised to obtain particle characteristic measurements of the particles. The light inputs 15 may be strobed—that is, the illumination time of each light input 15 is relatively short such that the average movement of the particles may small enough to enable accurate particle characterisation during illumination. In embodiments such as that shown in FIG. 4B, the sequence of light input 15 illumination may also be relatively short, such that during the entire sequence the movement of the average particle movement is short. Preferably, each image captured by the imaging sensor 13 corresponds to a single illumination or sequence of illuminations. In embodiments such at that shown in FIG. 4B, light input(s) 15 may comprise a single spectrum or a plurality of spectra, and may operate for example in either of the modes depicted in FIG. 7 or FIG. 8, or some combination of these or other modes of operation.

Similarly, in an embodiment, the sample 50 is suspended in a liquid such that the sample 50 may move (e.g. due to Brownian motion) while contained above the first surface 21. Again, a strobing approach may be utilised such that the illumination time of the sample 50 is short to ensure minimal displacement of the sample 50 during image acquisition.

Figure 10:
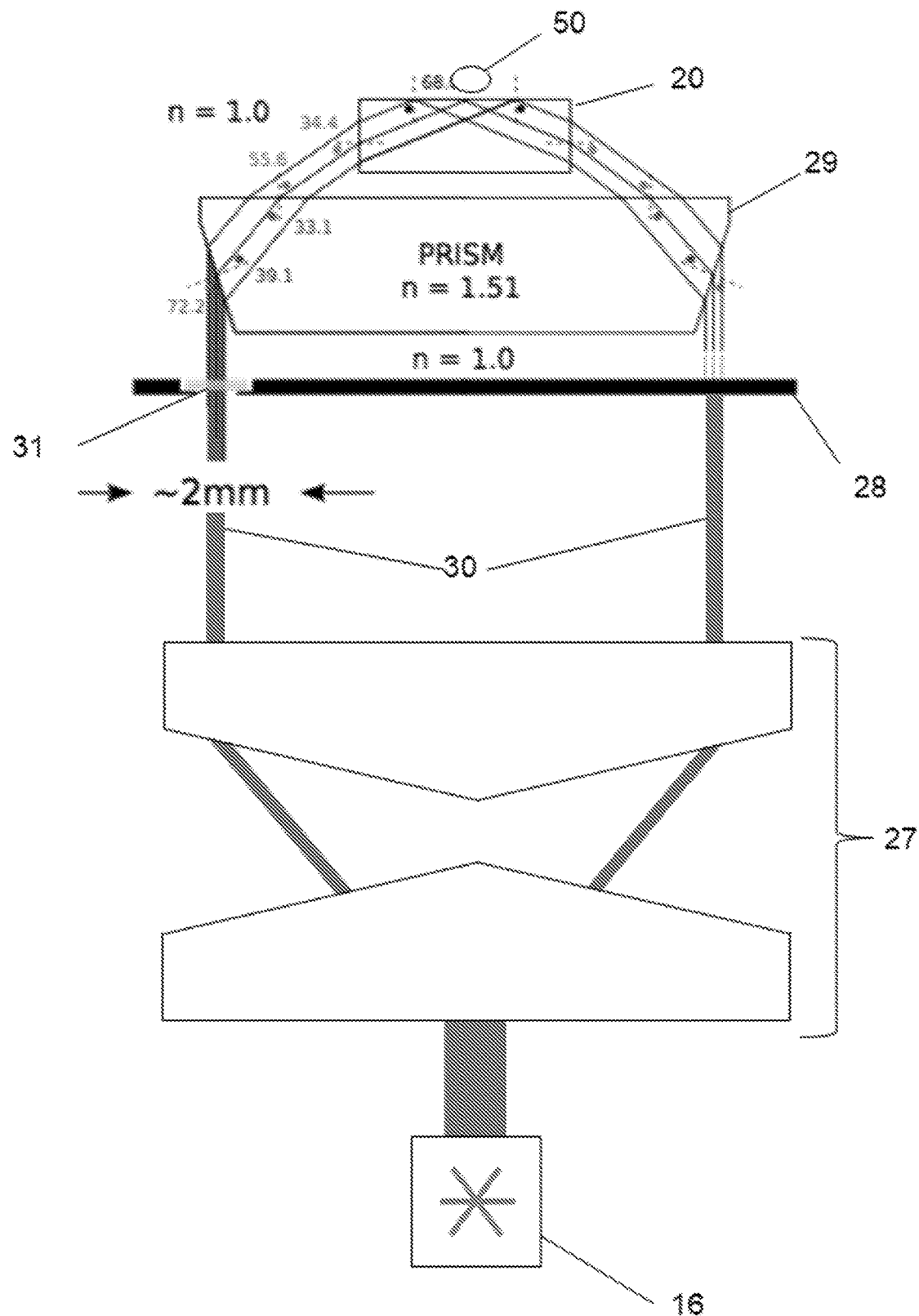
FIG. 10 shows an embodiment utilising a single light source and a continuously variable light input direction.

FIG. 10 shows an embodiment having a single light source 16 coupled to a rotating light input 15 of a rotating ring 28. The ring 28 is located between a prism 29 and the light source 15. The single light source 16 is directed through a lens and/or mirror arrangement 27 which is configured to produce an annular light pattern 30 (as shown), which has a diameter corresponding to the diameter of the ring 28. The light input 15 corresponds to an aperture 31 in the ring 28. Light exiting the light input 15 is refracted by a prism 29 such that it is directed, at an angle suitable for total internal reflection, into the optical medium 20. Therefore, the angle from which the sample 50 is illuminated may be effectively continuously changes in accordance with the rate of rotation of ring 28.

Embodiments described herein may provide for measurement of the sample characteristics such as size and shape of individual particles of a sample 50, in air or liquid. The embodiments may advantageously be useful for feature sizes (such as particles) having a size in the range of 1 millimetre (or maybe larger) down to 10s of nanometres (or maybe smaller). The techniques described may be suitable for building particle size parameter and/or shape parameter distributions from a large number of single-particle measurements.

Figure 11:
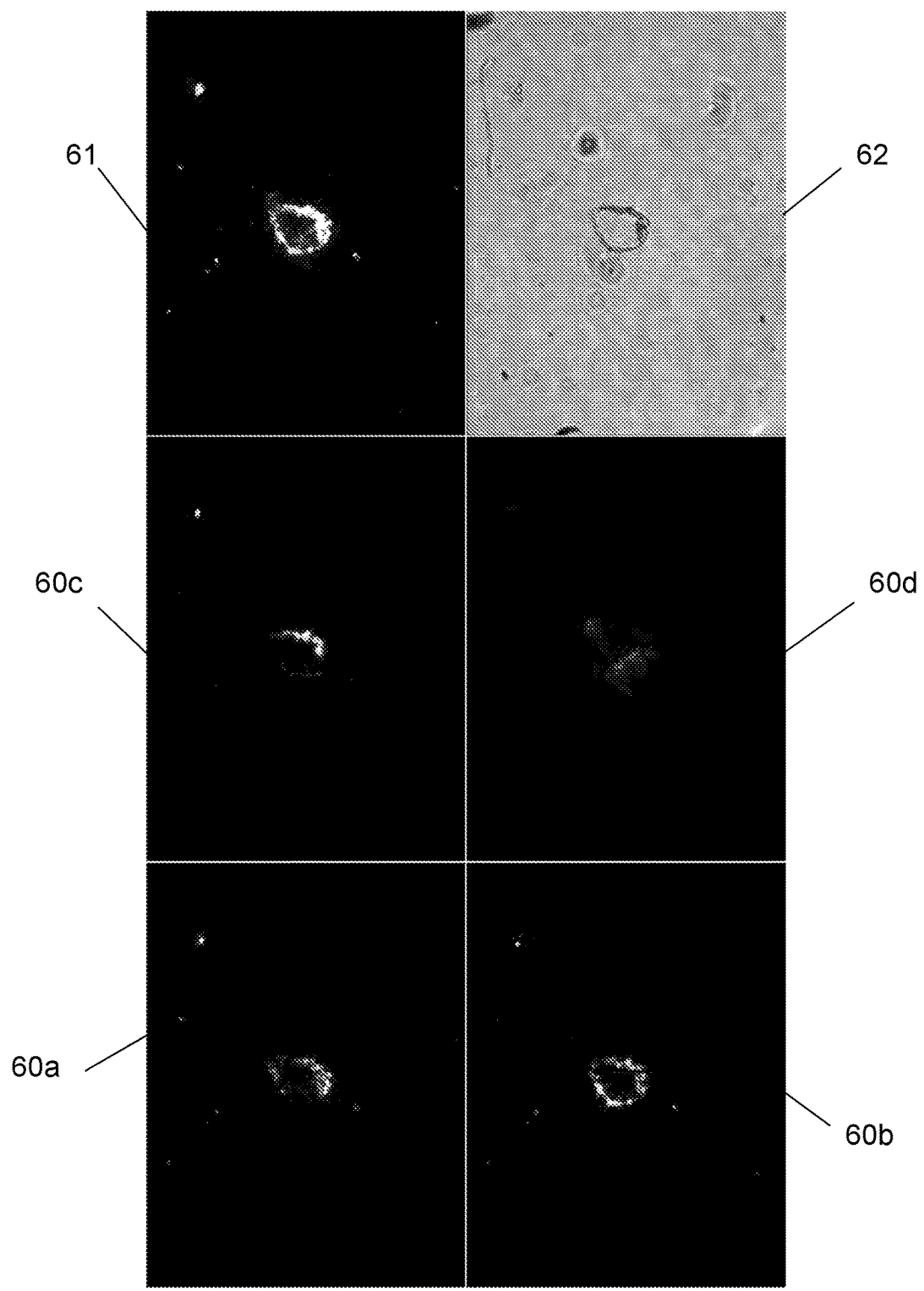
FIG. 11 shows an example of imaging a sample.

FIG. 11 shows an illustration of a composite image 61 and the four channel images 60a-60d that make up the composite image 61. That is, channel images 60a-60d each correspond to a direction of illumination and, in this case, a particular unique spectrum. The different channel images 60a-60d show the effect of illuminating the sample from different directions with evanescent fields, and the composite image 61 shows how the sample 50 may be characterised e.g. in determining shape parameters and/or size parameters. The optical image 62 shows that the correspondence between the composite image 61 and actual particle shape is consistent.

Figure 12:
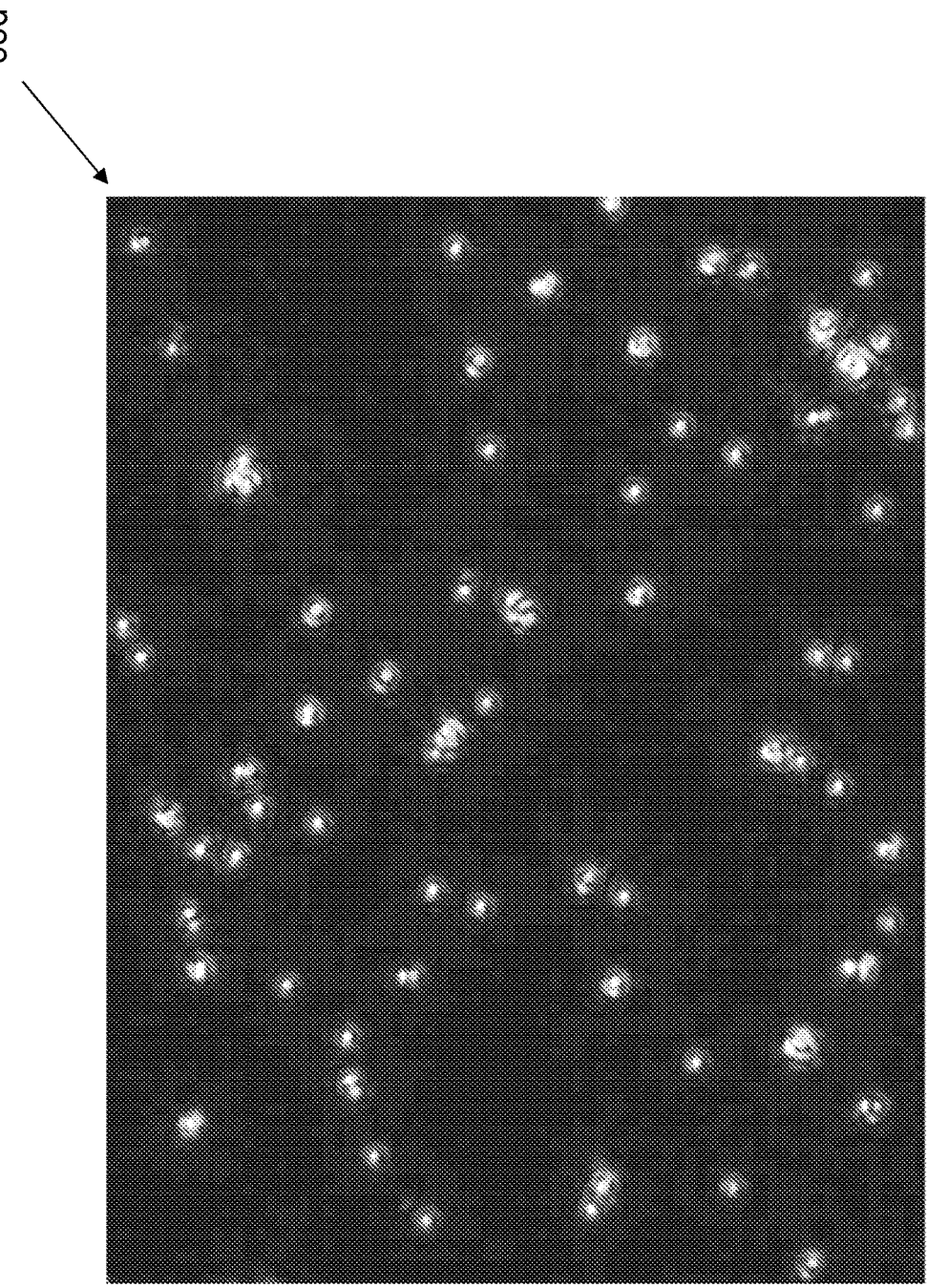
FIG. 12 shows an example of imaging a sample comprising a plurality of particles.

FIG. 12 shows an example image 55d of a plurality of particles making up the sample 50. It may be possible to characterise each of these particles. It may also be possible to determine statistical features such as average shape parameter(s) and/or size parameter(s).

Figure 13:
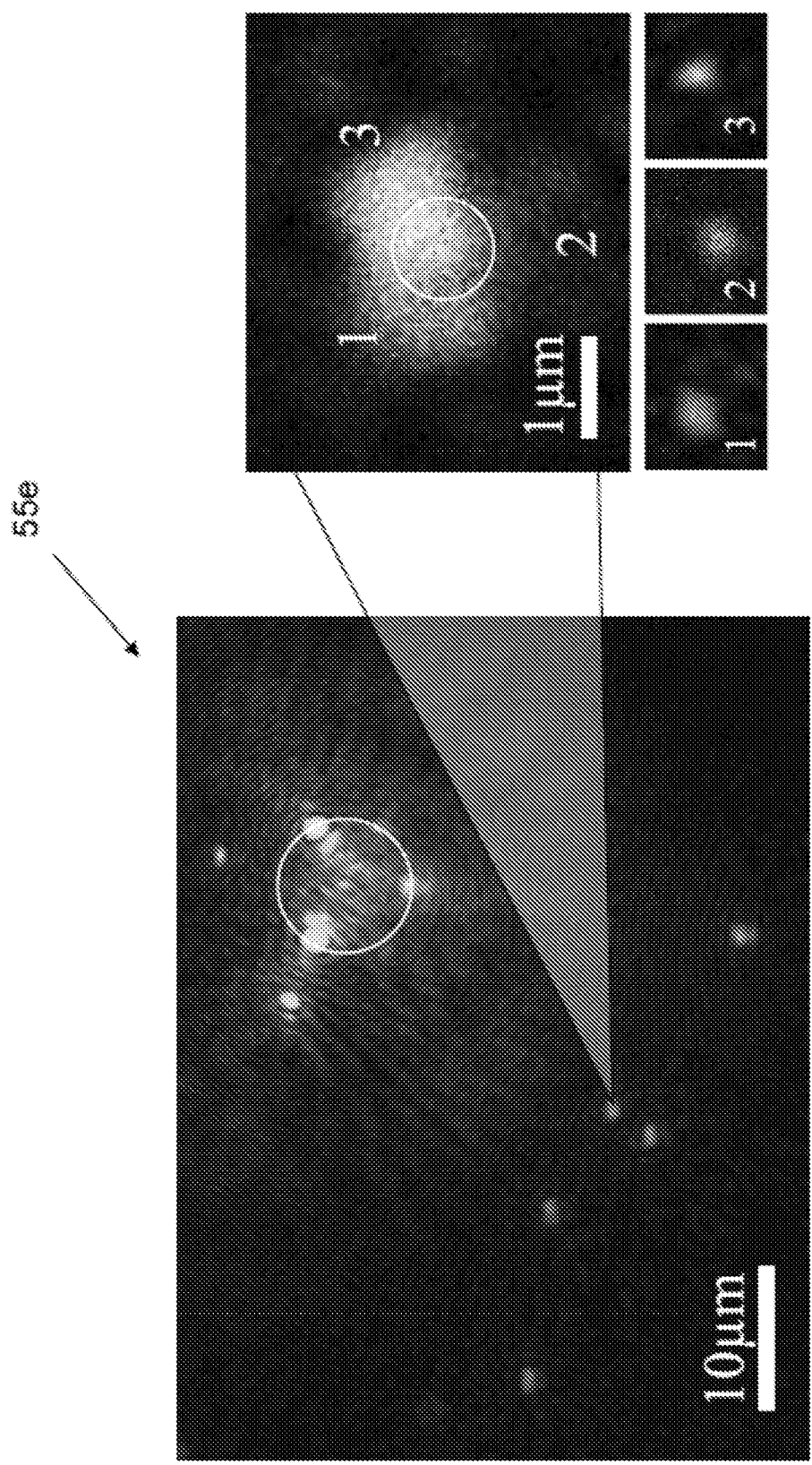
FIG. 13 shows another example of imaging a sample comprising particles of different size.

FIG. 13 shows an example image 55e of a plurality of particles making up the sample 50. In this case, there is included a larger particle (see broken line square box) and several smaller particles—the insert shows a magnified image of the smaller particles. Advantageously, the embodiments herein described may be suitable for identifying characteristics of particulars with large differences in size (e.g., in this case, roughly an order of magnitude) in a single imaging procedure.

Further modifications can be made without departing from the spirit and scope of the specification. For example, as mentioned herein, in some cases there may be a visible scattering bright region opposite a light input 15 in addition to a scattering bright region adjacent the light input 15. Where a geometry of a sample 50 is known to be relatively or substantially symmetrical (e.g. a sphere), a single illumination direction (i.e. one light input 15) may be sufficient to characterise the sample 50. In another example, where the pattern of scattered light resulting from at least one illumination direction and spectrum is well known for the type of sample 50 under observation, a single illumination direction (i.e. one light input 15) may be sufficient to characterise the sample 50 by reference to an existing database or model. Although size and shape parameters have been described herein for the purposes of exemplification, it is also anticipated that the resulting image when imaging a sample 50 may be interpreted to identify other sample characteristics—this may depend, for example, upon known properties of the sample 50 (e.g. a model developed through previous experimentation on the sample 50). Such a variation may be particularly useful for identifying a type of material present in the sample 50. In one example, a size or shape of a sample 50 may correlate with a particular material expected to be present within the sample 50.

Reference herein to background art is not an admission that the art forms a part of the common general knowledge in the art, in Australia or any other country.

The invention claimed is:

1. A method for characterising a sample located within an imaging region, the method comprising the steps of:
   generating two or more evanescent fields, each directed into the imaging region at a unique direction;
   capturing an image of the imaging region;
   determining one or more sample characteristics of the sample according to a spatial intensity pattern resulting from an interaction between each evanescent field and the sample within the image;
   wherein the two or more evanescent fields comprises at least two evanescent fields that are generated simultaneously and that are each associated with a unique characterising spectrum.

2. The method of claim 1, wherein the at least two evanescent fields further include at least two evanescent fields that are created according to a sequence, wherein the sequence includes at least one evanescent field generated after at least one other evanescent field.

3. The method of claim 1, wherein the image is captured by an image sensor coupled to an optical magnifier, such that the imaging region is viewable by the image sensor via the optical magnifier.

4. The method of claim 1, wherein the intensity pattern comprises one or more local intensity maxima, and wherein the one or more sample characteristics are determined at least in part based on an identified location of the one or more local intensity maxima.

5. The method of claim 4, wherein identifying one or more local maxima includes applying a filter for identifying a central location or locations of local maxima within the intensity pattern.

6. A sample characterising apparatus comprising an imaging sensor, an optical medium including a first surface above which a sample is positionable, and a plurality of light inputs each configured to direct light received by the light input into the optical medium, each from a unique direction, such as to produce total internal reflection from the first surface when no sample is present, wherein the imaging sensor is arranged to capture an image of a spatial intensity pattern due to a sample interacting with an evanescent field associated with each light input, wherein at least two of the light inputs are each associated with a unique characterising wavelength and are configured to direct light into the optical medium simultaneously, and wherein the imaging sensor is configured to image the first surface such that each light input is differentiable.

7. The sample characterising apparatus of claim 6, wherein for each light input, the angle at which light is projected into the imaging region is adjustable.

8. The sample characterising apparatus of claim 6, comprising a magnifier optically coupled to the imaging sensor.

9. The sample characterising apparatus of claim 6, wherein each light input is coupled to a light source.

10. The sample characterising apparatus of claim 9, wherein at least one light source is a laser.

11. The sample characterising apparatus of claim 9, wherein at least one light source is an LED light source.

12. The sample characterising apparatus of claim 11, comprising an optical coupler, wherein the optical coupler comprises the optical medium and the at least one LED light source.

13. A method for operating the a sample characterising apparatus for characterising a sample, the sample characterising apparatus comprising an imaging sensor, an optical medium, and a plurality of light inputs each configured to direct light received by the light input into the optical medium, each from a unique direction, the method comprising the steps of:

positioning a sample above a first surface of the optical medium;

generating two or more evanescent fields within the imaging region, each associated with a unique one of the plurality of light inputs, wherein the light inputs are arranged such that each evanescent field is associated with a unique direction; and capturing an image of the imaging region using the imaging sensor, said image including a spatial intensity pattern resulting from an interaction between each evanescent field and the sample within the imaging region, wherein the two or more evanescent fields comprises at least two evanescent fields that are generated simultaneously and that are each associated with a unique characterising spectrum.

14. The method of claim 13, further comprising the step of:

transmitting the captured image to a computer, wherein the computer is configured to determine one or more sample characteristics of the sample according to the spatial intensity pattern.

* * * * *